United States Patent [19]

Huddle

[11] Patent Number: 4,466,339
[45] Date of Patent: Aug. 21, 1984

[54] DIAPHRAGM ASSEMBLY

[75] Inventor: Francis G. Huddle, Eastleigh, England

[73] Assignee: William R. Selwood Limited, Eastleigh, England

[21] Appl. No.: 400,249

[22] Filed: Jul. 21, 1982

[30] Foreign Application Priority Data

Jul. 23, 1981 [GB] United Kingdom ............... 8122741

[51] Int. Cl.³ .............................................. F16J 3/02
[52] U.S. Cl. ..................................... 92/100; 92/98 R; 417/393; 417/395
[58] Field of Search ............... 417/395; 92/98 R, 102, 92/98 D, 99, 100, 101; 285/367

[56] References Cited

U.S. PATENT DOCUMENTS 3,034,450  5/1962  Kruckeberg ...................... 92/100 X
3,202,063  8/1965  Bissell et al. ...................... 92/99 X
4,334,838  6/1982  Fessler et al. ..................... 92/99 X

FOREIGN PATENT DOCUMENTS 1121507  8/1956  France .................................. 92/102
1102933  2/1968  France .

Primary Examiner—Leonard E. Smith
Attorney, Agent, or Firm—Cushman, Darby & Cushman

[57] ABSTRACT

A peripheral portion of a diaphragm is clamped beween respective clamping surfaces of clamping members by means of a band which embraces the clamping members. An abutment on one of the clamping members establishes a predetermined positional relation between the clamping members. In the fully tightened condition of the band, the pressure between the diaphragm and the clamping surfaces of the clamping members is independent of the tension in the band.

5 Claims, 2 Drawing Figures

DIAPHRAGM ASSEMBLY

BACKGROUND OF THE INVENTION

1. Field of the Invention

The invention relates to an assembly of the kind comprising a flexible diaphragm, two clamping members and a band, wherein a peripheral portion of the diaphragm is clamped between respective clamping surfaces on the clamping members, peripheral portions of the clamping members are embraced by the band and the band is subjected to tension to establish and maintain pressure contact between the diaphragm and the clamping members. In an assembly of this kind, the band has a transverse cross-section which includes two limbs between which the peripheral portions of the clamping members are received. The band commonly has a transverse cross-sectional shape approximating to that of a 'U' with the limbs diverging from each other. For establishing tension in the band, there is commonly provided a screw and nut which cooperate with housings provided on opposite end portions of the band. The band of an assembly of this kind is commonly referred to as a "V-band clamp".

2. Description of the Prior Art

Assemblies of the kind referred to are used in air-operated diaphragm pumps wherein a medium which is to be pumped is separated from air by the diaphragm. In known assemblies of this kind used in diaphragm pumps, mutual approach of the clamping surfaces is limited only by the diaphragm. Whilst it is possible to establish at least approximately a predetermined pressure between the diaphragm and the clamping surfaces by applying a predetermined torque to the nut of a screw and nut mechanism of the band, excessive tightening of the band is possible with known arrangements, thereby increasing the pressure beyond the optimum amount. If the peripheral portion of the diaphragm is subjected to excessive stress, it will be permanently deformed or otherwise damaged.

A further disadvantage of the known arrangements is that the radial position of one clamping member relative to the other clamping member is not accurately controlled by the band. There is freedom for some degree of misalignment and, since the peripheral portions of the clamping members are covered by the band, it is not easy to check visually that the clamping members are properly sligned with each other.

SUMMARY OF THE INVENTION

According to the present invention, an assembly of the kind referred to has positioning means which establish a predetermined positional relation between the clamping members in the assembly.

The positioning means may be adapted to establish a predetermined position of one clamping member relative to the other clamping member in a direction transverse to an axis of the assembly. By an axis of the assembly, we mean a line passing through the centres of both faces of the diaphragm. Additionally or alternatively, the positioning means may be adapted to limit mutual approach of the clamping surfaces.

There is also provided in accordance with the invention an assembly of the kind referred to wherein the pressure between the diaphragm and the clamping surfaces cannot be increased by further tightening of the band. The pressure between the diaphragm and the clamping surfaces is preferably independent of the tension in the band.

BRIEF DESCRIPTION OF THE DRAWINGS

An example of an air-operated double-diaphragm pump having two assemblies of the kind referred to will now be described, with reference to the accompanying drawing, wherein.

DESCRIPTION OF THE PREFERRED EMBODIMENTS

Figure 1:
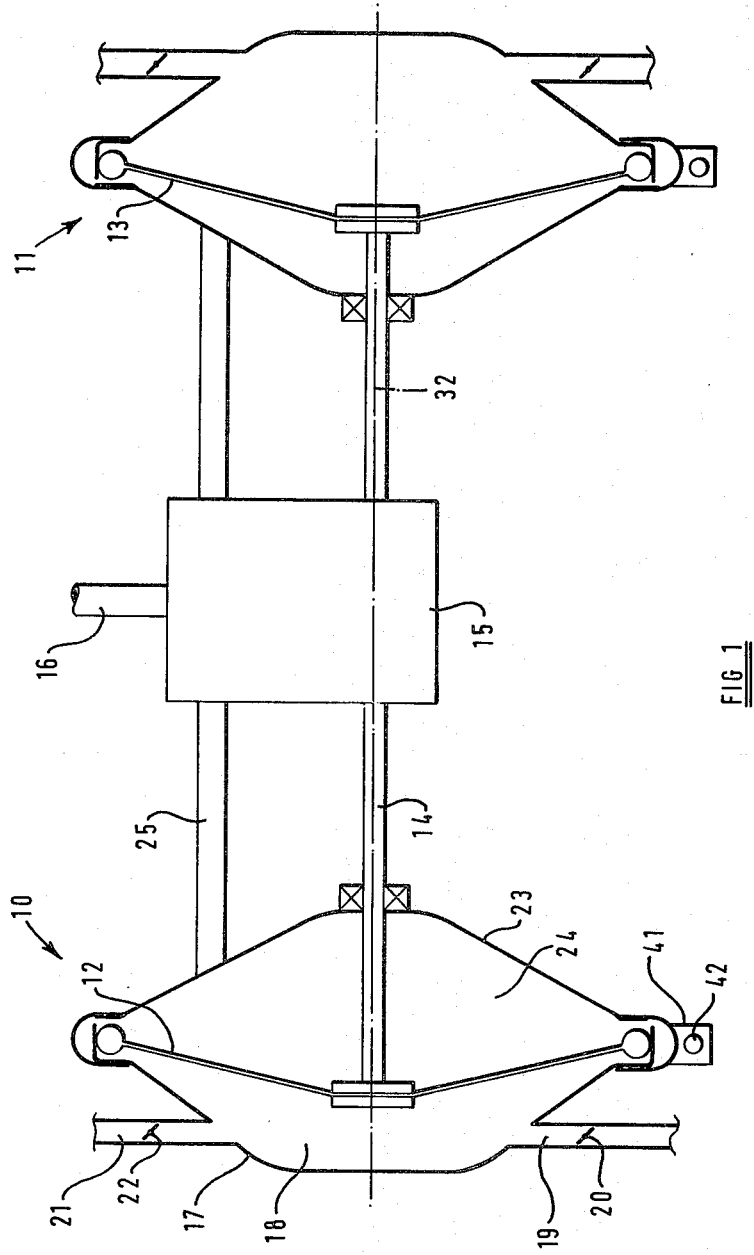
FIG. 1 illustrates the general arrangement of the pump diagrammatically.

The pump illustrated in the accompanying drawings comprises two diaphragm assemblies 10 and 11, the respective diaphragms 12 and 13 of which are connected together by a connecting rod 14 which reciprocates during operation of the pump. A mid portion of the connecting rod extends through a valve block 15 comprising valves (not shown) for controlling the supply of air under pressure from an air inlet 16 to the diaphragm assemblies alternately. The valve block and valves may be of known construction and arrangement.

The diaphragm assembly 10 comprises a first clamping member 17 which, in conjunction with the diaphragm 12, defines a product chamber 18 having an inlet 19 controlled by an inlet valve 20 and an outlet 21 controlled by an outlet valve 22. The inlet and outlet valves are non-return valves of known form.

The diaphragm assembly 10 further comprises a second clamping member 23 which, in combination with the diaphragm 12 defines an air chamber 24 connected by a duct 25 with the valve block. The diaphragm is resiliently flexible, whereas the clamping members are substantially rigid.

The diaphragm assembly 11 comprises the same components arranged in the same manner as are present in the diaphragm assembly 10. During operation, air is directed from the air inlet 16 to the air chamber 24 and is concurrently exhausted from the corresponding air chamber of the assembly 11 to drive pumped fluid from the chamber 18 through the outlet 21 and to draw pumped fluid into the corresponding product chamber of the assembly 11. When the connecting rod 14 reaches the limit of its stroke in a direction towards the chamber 18, air from the inlet 16 is re-directed to the air chamber of the assembly 11 and the air chamber 24 is exhausted. This drives pumped fluid from the product chamber of the assembly 11 through the outlet of that chamber and draws further pumped fluid into the chamber 18.

As viewed along an axis 32 which passes through the centres of both faces of each of the diaphragms 12 and 13, the diaphragm 12 and clamping members 17 and 23, the diaphragm and clamping members are preferably circular.

Figure 2:
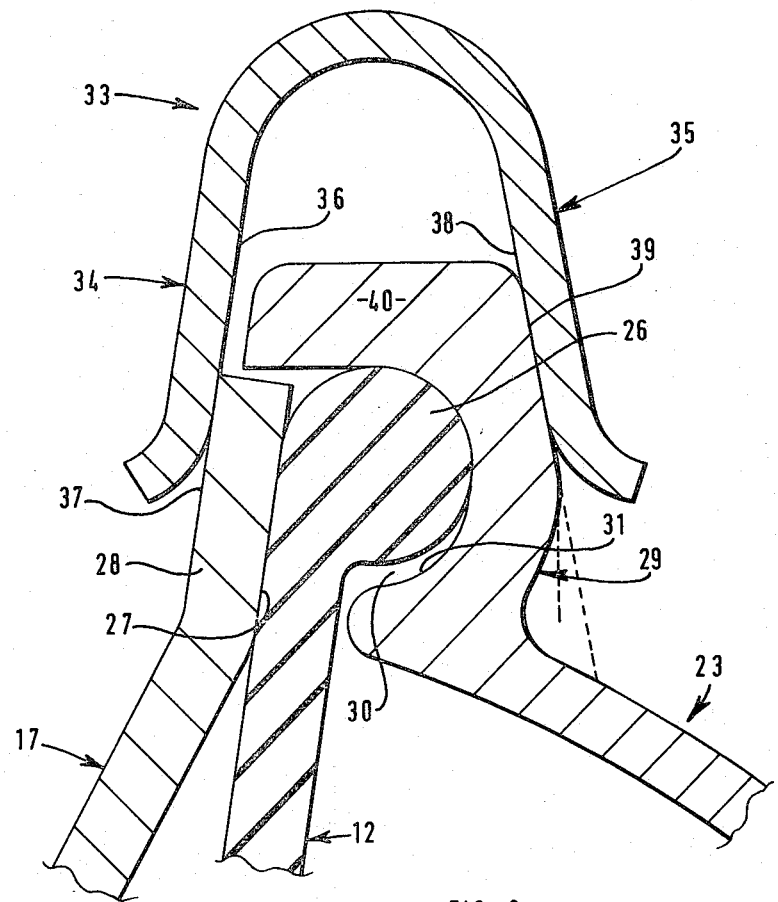
FIG. 2 shows a diametral cross-section through a part of one of the diaphragm assemblies.

As shown in FIG. 2, the diaphragm 12 has a peripheral portion which includes a bead 26. This peripheral portion is engaged by a frusto-conical clamping surface 27 on a peripheral portion 28 of the clamping member 17. The clamping member 23 has a peripheral portion 29 defining an annular recess 30, an open mouth of which faces towards the peripheral portion 28 of the other clamping member. When the clamping member 23 is viewed in diametral cross-section, as in FIG. 2, the recess 30 has a profile which is approximately semicircular. A part of the clamping surface which forms the boundary of the recess 30 constitutes a seat 31 which faces in a direction away from the axis 32.

To establish and maintain pressure contact between the diaphragm 12 and the clamping members 17 and 23, there is provided a band 33 which embraces the peripheral portions 28 and 29 of the clamping members. The transverse cross-section of the band shown in FIG. 2 is approximately U-shaped, the band having mutually divergent limbs 34 and 35 between which the peripheral portions 28 and 29 are received. For ease of assembly of the band with the clamping members, free end portions of the limbs 34 and 35 are turned outwardly. The limb 34 has a frusto-conical inner surface 36 which engages an axially outer face 37 of the peripheral portion 28. An inner surface 38 of the limb 35 engages an axially outer surface 39 of the peripheral portion 29. The surfaces 36 to 39 are all frusto-conical and inclined to the axis 32 at the same angle.

The peripheral portion 29 on the clamping member 23 includes positioning means in the form of an abutment 40 which lies radially outwardly of the recess 30. The abutment projects from the recess in a direction along the axis 32 to overlap the peripheral portion 28 of the clamping member 17. The internal diameter of the abutment 40 is slightly greater than the diameter of the clamping member 17 so that the latter can be received within the abutment. The abutment thereby establishes a predetermined position of the clamping member 17 relative to the clamping member 23 in all directions transverse to the axis 32. Any divergence from this relation brings the clamping member 17 into engagement with a surface of the abutment which faces towards the axis 32.

Alternative arrangements for establishing a predetermined position of the clamping member 17 relative to the clamping member 23 (not shown in the drawings) can be used. Beads may be provided on one or both of the clamping members for location in corresponding recesses moulded in the peripheral portion of the diaphragm.

On opposite end portions of the band 33 are provided housings, one of which is shown in FIG. 1 at 41. There extends through apertures in these housings a screw of a screw and nut mechanism 42 by means of which the housings can be drawn together to establish and maintain in the band 33 tension which tends to cause radial contraction of the band and thereby draw the clamping members 17 and 23 towards each other along the axis 32.

As shown in FIG. 2, the components of the diaphragm assembly 10 are loosely assembled together but the band 33 is free of tension. It will be noted that the abutment 40 is spaced somewhat from the limb 34 of the band which is engaged with the surface 37. The limb 35 is engaged with the surface 39. The bead 26 is circular, as viewed in cross-section and does not completely fill the recess 30.

When the screw and nut mechanism is operated to tension the band 33, the limbs 34 and 35 slide radially inwardly on the surfaces 37 and 39, drawing the clamping members together.

Eventually, the abutment 40 comes into engagement with the limb 34 of the band. When this happens, the assembly is fully tightened, the abutment providing a means for preventing a further increase in pressure between the diaphragm and the clamping surfaces so that the peripheral portion of the diaphragm 12 is subjected to a predetermined stress. The peripheral portion of the diaphragm occupies the recess 30 completely. In the fully tightened condition of the assembly, the pressure between the diaphragm 12 and the clamping surfaces of the clamping members is independent of the tension in the band 33 and therefore cannot be increased by further tightening of the band. Any further tightening of the band which is caused merely causes deformation of the band by movement of the limbs 34 and 35 away from each other. The required pressure can be established between the diaphragm and the clamping members without the use of a torque wrench.

It will be noted that, in the fully tightened condition of the diaphragm assembly, the inner surface 36 of the limb 34 is engaged by both the peripheral portion 28 of the clamping member 17 and the abutment 40 of the calmping member 23. Thus, the abutment establishes a predetermined positional relation of the clamping members along the axis 32.

Alternative forms of band may be used. Thus, the band may comprise a plurality of shoes which bear the limbs 34 and 35 and are connected together by a strip which has a flat cross-section, as viewed in a plane containing the axis 32.

I claim:

1. An assembly which defines an axis comprising:
   a flexible diaphragm, two clamping members and a band,
   wherein a peripheral portion of the diaphragm is clamped between respective clamping surfaces on the clamping members, peripheral portions of the clamping members are embraced by the band and the band is subjected to tension to establish and maintain pressure contact between the diaphragm and the clamping members, and
   positioning means establishing a predetermined positional relation between the clamping members in the assembly,
   said positioning means comprising an abutment on one of the clamping members for limiting mutual approach of the clamping surfaces when the band is tightened,
   wherein the abutment has two opposed faces, both of which are engaged with the band.

2. An assembly according to claim 1 wherein said faces of the abutment are mutually inclined.

3. An assembly according to claim 1 or 2 wherein the abutment is engageable also with the other clamping member to establish a predetermined relative position of the clamping members in directions transverse to the axis of the assembly.

4. An assembly according to claim 1 or 2 wherein the clamping surface of said one clamping member defines an annular recess in the one clamping member.

5. An assembly according to claim 4 wherein the clamping surface of the other clamping member is frustoconical.

* * * * *